(12) United States Patent
Shiau et al.

(10) Patent No.: US 7,304,692 B2
(45) Date of Patent: Dec. 4, 2007

(54) LIQUID CRYSTAL DISPLAY WITH DEFECT REPARABILITY

(75) Inventors: Fu-Yuan Shiau, Chiayi (TW); Kuang-Hsiang Lin, Taoyuan Hsien (TW); Ming-Zen Wu, Kaohsiung (TW); Yan-Chun Chiu, Pa Te (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 329 days.

(21) Appl. No.: 10/859,306

(22) Filed: Jun. 2, 2004

(65) Prior Publication Data
US 2005/0270435 A1   Dec. 8, 2005

(51) Int. Cl.
*G02F 1/1333* (2006.01)

(52) U.S. Cl. .................... 349/54; 349/139
(58) Field of Classification Search ............ 349/53–55, 349/139
See application file for complete search history.

(56) References Cited

U.S. PATENT DOCUMENTS

| 5,121,236 A | 6/1992 | Ukai et al. |
| 6,636,289 B2 * | 10/2003 | Yoo et al. ............... 349/141 |
| 2006/0050219 A1 * | 3/2006 | Lee ........................ 349/141 |

FOREIGN PATENT DOCUMENTS

| JP | 08-328035 | 12/1996 |
| JP | 2000-310796 | 11/2000 |
| JP | 2004-093654 | 3/2004 |

* cited by examiner

*Primary Examiner*—Dung T. Nguyen
(74) *Attorney, Agent, or Firm*—Thomas, Kayden, Horstemeyer & Risley (57) ABSTRACT

A liquid crystal display with defect reparability including two vertical common lines and a plurality of horizontal common lines in a pixel, wherein the vertical common lines are parallel to a data line, and each horizontal common line is intersected to connect with each vertical common line. Each horizontal common line is extended to pass through but not touch the data line and connect with a horizontal common line in a neighboring pixel, and the horizontal common lines have overlaps with the data line in a different plane.

15 Claims, 5 Drawing Sheets

LIQUID CRYSTAL DISPLAY WITH DEFECT REPARABILITY

FIELD OF THE INVENTION

The present invention relates to a liquid crystal display, and more particularly, to a liquid crystal display with defect-repair design.

BACKGROUND OF THE INVENTION

In thin film transistor liquid crystal display (TFT-LCD) fabrication, there are usually some point defects, open circuit, and short circuit defects in a panel caused by the manufacturing process or by environmental conditions, such as electro-static discharge (ESD) or particle contamination, which degrade display quality and thus significantly reduce product yield.

Therefore, repair lines or repair patterns are sometimes designed into panel layouts to facilitate defect repair. In most cases, these repair lines and patterns are located completely outside of the display region or in peripheral circuit regions near panel edges to accommodate defect repair in the display region by employing a laser.

Because the location of repair lines and patterns are distant from defects, a repair process first involves identifying a defect position, and then moving the LCD panel to find repair positions outside the display region. Thus, time spent for repair is significant and unfavorable for production. In addition, the actual repair efficiency is limited by a finite area available for locating repair lines outside the display region.

Besides, repair lines located in peripheral circuit regions are also in redundant, have lengths much greater than data lines and scan lines, and overlap many data and scan lines, the RC loading of each metal line is thus readily increased, and a signal distortion problem is also induced.

Furthermore, for pixels with a storage-capacitor-on-common ($C_{st}$-on-common) design, there is only one common line in any pixel region, so a $C_{st}$-open condition is induced easily if a common-line-open condition occurs during manufacture.

SUMMARY OF THE INVENTION

An objective of the present invention is to provide a liquid crystal display (LCD) which facilitates and effective repair of defects via laser, thereby improving defect repair efficiency and display device production yields. Additionally, for pixels with a storage-capacitor-on-common ($C_{st}$-on-common) design, $C_{st}$-open conditions occurring simultaneously with common-line-open conditions can be avoided by placing numerous common lines in each pixel.

According to the aforementioned objectives of the present invention, a LCD with good reparability of defects is provided. The present invention places a plurality of common lines in each pixel display region for a panel with a $C_{st}$-on-common design to provide more common lines and defect repair lines. Each pixel includes two vertical common lines parallel to a data line and a plurality of horizontal common lines intersecting the vertical common lines, with one of the vertical common lines placed near the data line that controls the pixel.

Each horizontal common line intersects each vertical common line, and each horizontal common line is extended to pass through the data line to connect a horizontal common line in a neighboring pixel. The horizontal common lines are located on a different plane than the data line and thus have overlaps with the data line. By using a laser repair process at these overlaps between the horizontal common lines and the data line as well as at the intersections of the common lines, line defects in the data line and point defects can be repaired effectively.

Additionally, the horizontal common lines of the present invention can be designed as a horizontal, diagonal or zigzag pattern, depending on desired functionality and usability. A plurality of side-extending leads can also be added onto the vertical common line near the data line, and breaches in the vertical common line near the data line can be designed between the side-extending leads in advance. These side-extending leads are extended to have overlaps with the data line to offer more locations for repair, and the line breaches are beneficial to reduce laser cutting steps in the defect repair process.

Moreover, each pixel electrode is designed to have openings exposing intersections of the vertical common lines and the horizontal common lines, and the intersections of the common lines are thus not obstructed by the pixel electrode. Laser cutting the common lines in a defect repair process is not, therefore, affected by the pixel electrode and can be processed more smoothly.

With the application of the present invention, the LCD with defect-repair design offers a plurality of common lines to facilitate the defect repair for each pixel, and a display panel with a better capacity for defect repair is obtained. Defects in the panel are repaired by utilizing the nearest common lines immediately, and the efficiency of defect repair is thus improved greatly. In addition, because the common lines designed in each pixel are used as repair lines, the high RC loading due to redundant repair lines is avoided, thus a signal distortion problem is mitigated.

The LCD of the present invention not only has good defect reparability but also reduces the probability of a $C_{st}$-open condition. When an open circuit defect is occurred in one common line, a $C_{st}$-open condition is not simultaneously produced by utilizing other common lines designed in the pixel.

According to aforementioned advantages of the invention, the product yields and function reliability of a display device are promoted greatly by employing this invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

The present invention designs a plurality of common lines located in each pixel display region for a display with a storage-capacitor-on-common ($C_{st}$-on-common) design, and common lines are intersected each other and have overlaps with data lines on a different plane. When the data line has an open circuit defect or the panel has a point defect, parts of the common lines in each pixel are used as repair lines by applying a laser to the common lines; and defects in the display region are thus repaired rapidly and effectively. Moreover, since intersections of the common lines are not obstructed by pixel electrodes, laser cutting for the common lines is processed smoothly.

Embodiment 1

Figure 1:
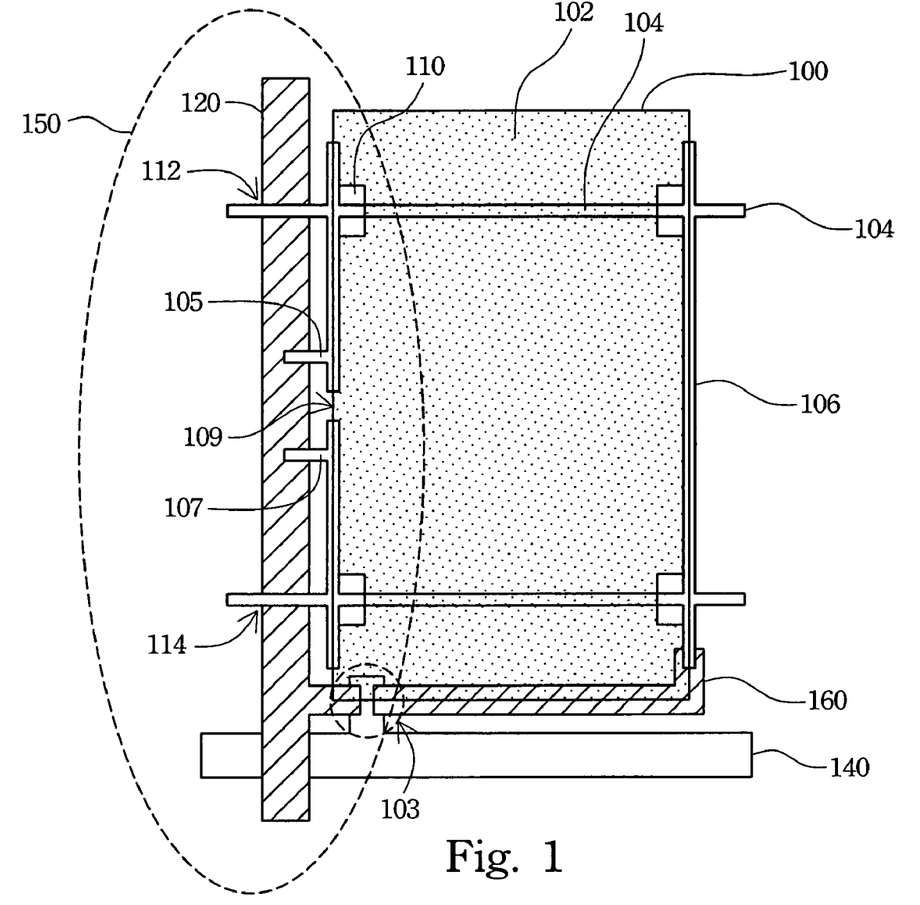
FIG. 1 is a top view showing a partial structure of the liquid crystal display in accordance with the first preferred embodiment of the present invention.
Figure 2:
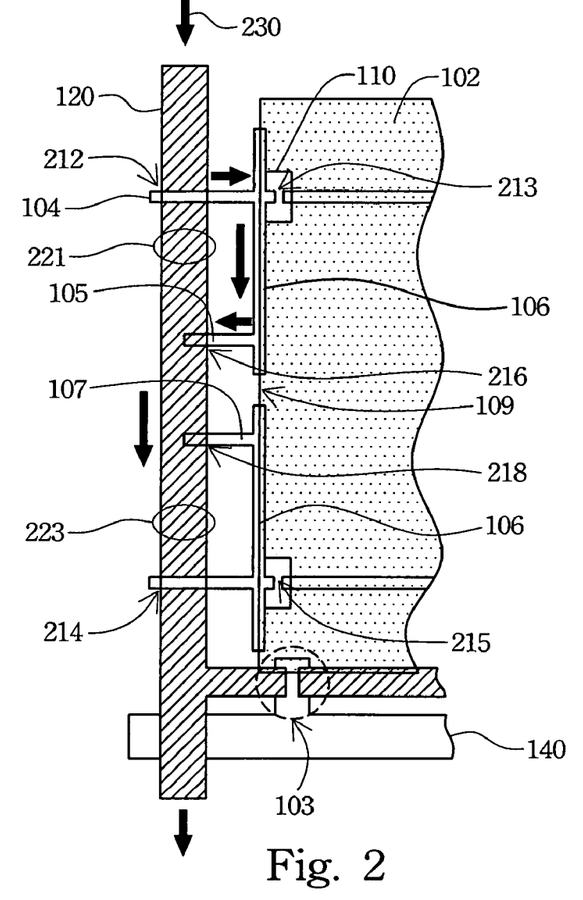
FIG. 2 is a schematic diagram showing the defect repair of the liquid crystal display in accordance with the first preferred embodiment of the present invention.

The present invention discloses a liquid crystal display (LCD) with defect reparability. Referring to FIG. 1 and FIG. 2 respectively, FIG. 1 is a top view showing a partial structure of the LCD in accordance with the first preferred embodiment of the present invention, and FIG. 2 is a schematic diagram showing the defect repair of the LCD in accordance with the first preferred embodiment of the present invention. The position shown in FIG. 2 is an enlarged view of the region 150 in FIG. 1.

In FIG. 1, a region 100 cross-controlled by a data line 120 and a scan line 140 respectively is a pixel display area covered by a pixel electrode 102. The display state of the display region 100 is controlled by the thin film transistor (TFT) 103, and a signal from the data line 120 is transmitted to the region 100 by a drain metal 160 contacting to the pixel electrode 102. For the display region 100 with a $C_{st}$-on-common design, two horizontal common lines 104 and two vertical common lines 106 are placed in the region 100. Two vertical common lines 106 are located on two sides of the display region 100 and parallel to the data line 120 respectively, and each horizontal common line 104 is perpendicular to intersect each vertical common line 106 to form a "#" pattern. The horizontal common lines 104 also pass through the data line 120 and have overlaps with the data line 120 at position 112 and position 114.

The horizontal common lines 104 and the vertical common lines 106 are all located in the same plane and intersected to link together, but the data line 120 is on a different plane and has no contact with the horizontal common lines 104 or the vertical common lines 106. The overlap position 112 and the overlap position 114 are utilized to form short circuits between the horizontal common lines 104 and the data line 120, and connections between the horizontal common lines 104 and the vertical common lines 106 are also utilized to provide repair lines.

In addition, a side-extending lead 105 and a side-extending lead 107 are located on the vertical common line 106 near the data line 120, wherein the side-extending lead 105 and the side-extending lead 107 are extended to have unconnected overlaps with the data line 120 to offer more locations at which short circuits may be formed for defect repair. Additionally, an open breach 109 in the vertical common line 106 near the data line 120 is placed between the side-extending lead 105 and the side-extending lead 107 in advance such that less laser cutting is necessary during repair processes.

Because the pixel electrode 102 is on the horizontal common lines 104 and the vertical common lines 106, the pixel electrode 102 is designed to have openings 110 exposing the intersections of the horizontal common lines 104 and the vertical common lines 106 in the embodiment, and regions on the horizontal common lines 104 for connecting with the vertical common lines 106 are thus unobstructed by the pixel electrode 102. Therefore, laser cutting during a defect repair process is unaffected by the pixel electrode 102 and processed more smoothly.

A defect repair process is described as follows and shown in FIG. 2 if the data line 120 has an open circuit defect. Referring to FIG. 2, when a data signal 230 is unable to transmit successfully due to an open circuit defect 221 in the data line 120, the data line 120 is connected electrically to the horizontal common line 104 at a position 212 to form a short circuit by laser, and the side-extending lead 105 is connected to the data line 120 at a position 216 to form another short circuit by laser. Then, the horizontal common line 104 is cut at a position 213 by laser cutting.

The data signal 230 can then still be transmitted to the TFT 103 and down to other pixels by employing the electrical connection between the data line 120, the horizontal common lines 104 and the vertical common line 106 near the data line 120. The arrows in FIG. 2 represent the new path of data signal 230 along the repaired circuitry.

The horizontal common lines 104 and the vertical common line 106 near the data line 120 are thus changed into repair lines by electrical connection with the data line 120 by laser. The open breach 109 in the vertical common line 106 is designed in advance so there is no need to cut the vertical common line 106 via another laser cutting step.

Because the horizontal common lines 104 are made of different material than the pixel electrode 102 (i.e. indium tin oxide, ITO), the process condition for laser cutting the horizontal common lines 104 is different from the pixel electrode 102. To address this, the pixel electrode 102 is designed as a structure with openings 110 in this embodiment, and thus the efficiency of laser cutting the horizontal common lines 104 at the position 213 is not affected by the pixel electrode 102.

If another open circuit defect 223 occurred in the data line 120, the same repair method could be utilized to electrically connect the side-extending lead 107 with the data line 120 at a position 218 and to connect the data line 120 with the horizontal common line 104 at a position 214 by laser. Then, the horizontal common line 104 would be laser cut at a position 215, and the open circuit defect 223 is thus repaired.

Figure 3:
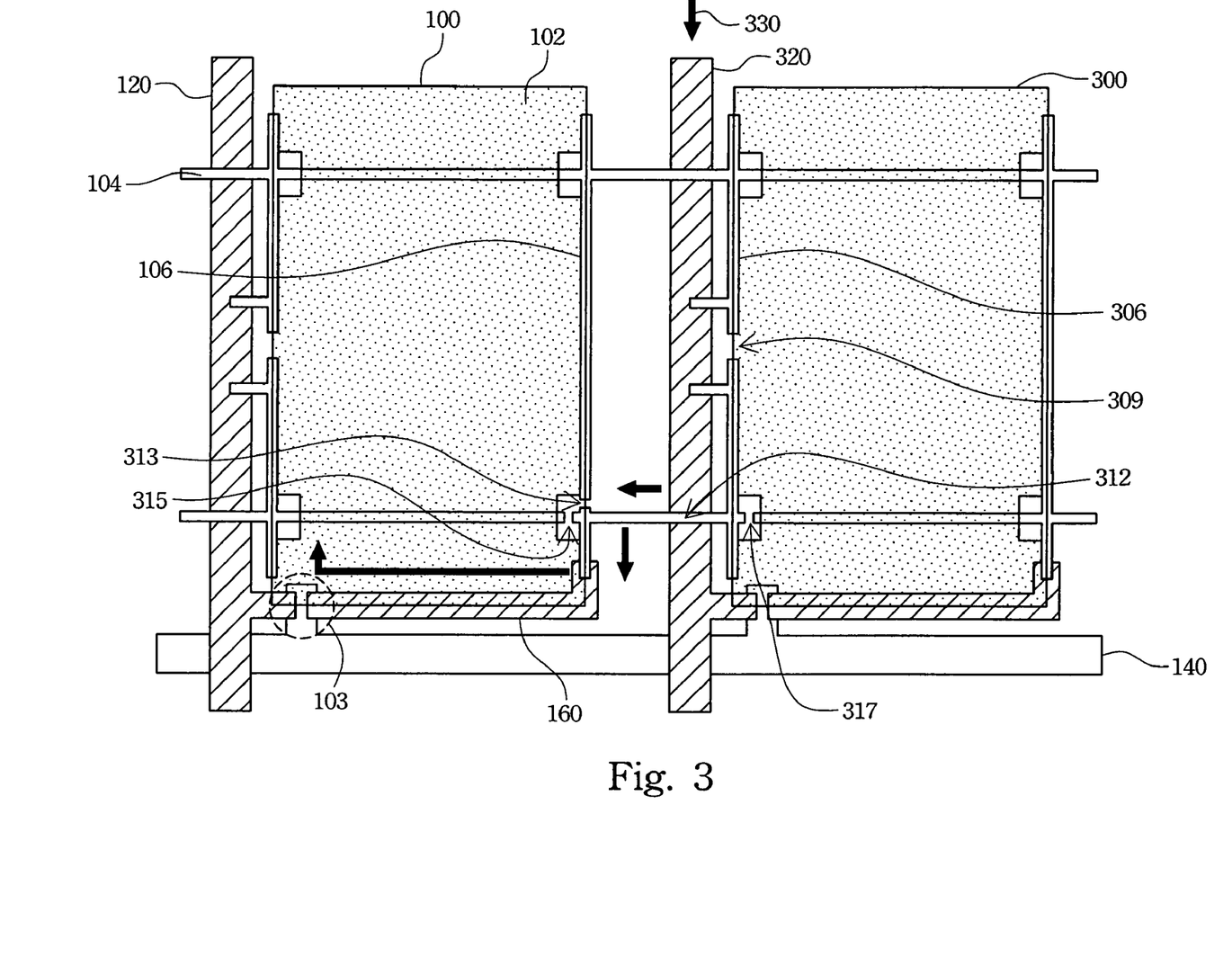
FIG. 3 is a schematic diagram showing the defect repair for a point defect on the liquid crystal display in accordance with the first preferred embodiment of the present invention.

In addition to the aforementioned functionality, a point defect in a panel is also repaired by employing this invention, and a repair process for a point defect is described as follows and shown in FIG. 3. FIG. 3 accompanies the description and is a schematic diagram showing the repair of a point defect of the LCD in accordance with the first preferred embodiment of the present invention.

Referring to FIG. 3, in addition to overlapping the data line 120, the horizontal common lines 104 are further extended to a neighboring pixel display region 300, connected to the vertical common lines 306, and then pass through another data line 320 to have overlaps with it.

If the TFT 103 in the display region 100 is faulty due to manufacturing problems, the region 100 becomes a point defect in a panel. To repair the point defect, the horizontal common line 104 is connected electrically to the data line 320 at a position 312 to form a short circuit by laser, and the vertical common line 106 is connected electrically to the drain metal 160 in the region 100 to form another short circuit by laser. Then, the vertical common line 106 is laser cut at a position 313, and the horizontal common line 104 is cut at a position 315 and a position 317. An open breach 309 designed in the vertical common line 306 is then utilized.

Thus, a data signal 330 is transmitted to the drain metal 160 and further transmitted to the pixel electrode 102 in the region 100 by employing the electrical connection between the data line 320, the horizontal common lines 104 and the vertical common line 106 near the display region 300. The display function of the display region 100 is then controlled by the data line 330, and the point defect of the display region 100 is repaired.

According to the first embodiment, defect reparability is designed into the common line structure of the pixel, and a defect is repaired immediately after defect identification by utilizing a laser on the common lines nearest to the defect. Therefore, there is no need to spend time to move a panel into a repair process, and the efficiency of defect repair is improved greatly. Furthermore, because repairs can be made in such close proximity to the defects, high RC loading due to redundant and lengthy repair lines is avoided, and a signal distortion problem is mitigated.

Furthermore, the intersections of the common lines are not obstructed by the pixel electrode in this embodiment, and laser cutting for the common lines is thereby accomplished smoothly by cutting the common lines directly. There is no need to cut the pixel electrode in advance by another laser cutting step before cutting the common lines, and laser cutting for the common lines is unaffected by the pixel electrode; so repair efficiency is thus enhanced.

With the application of the present invention, a $C_{st}$-open condition due to a common line open circuit can be avoided by the use of a plurality of common lines designed into a pixel.

In the first embodiment, the open breach in the vertical common line is not necessary, but avoids having to laser cut the vertical common line at a proper position if a defect needs to be repaired. The side-extending leads are also not necessary, and defect-repair can still be achieved solely by the connections of the vertical common lines and the horizontal common lines.

Embodiment 2

Figure 4:
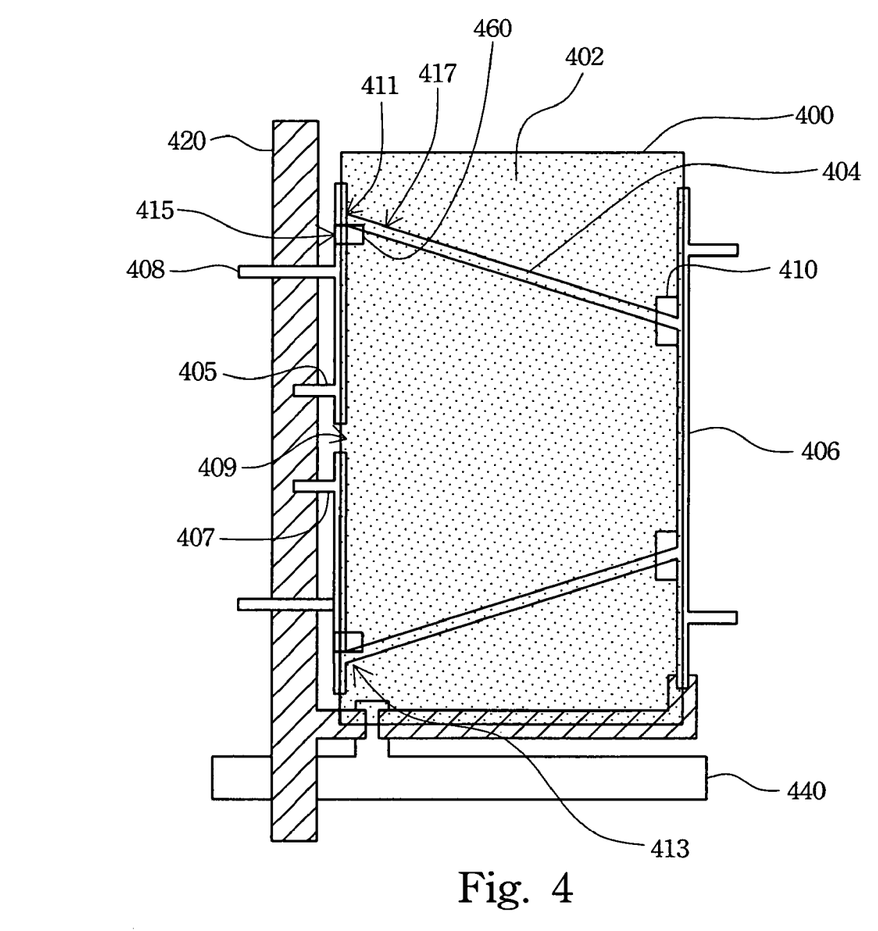
FIG. 4 is a top view showing a partial structure of the liquid crystal display in accordance with the second preferred embodiment of the present invention.

The present invention discloses another LCD with defect-reparability. The pattern of the horizontal common lines is changed to reduce leakage of light from the openings designed in the pixel electrode. Referring to FIG. 4, a top view is shown of a partial structure of the LCD in accordance with the second preferred embodiment of the present invention.

In FIG. 4, two horizontal common lines 404 and two vertical common lines 406 are placed in the region 400 which is cross-controlled by a data line 420 and a scan line 440, and each horizontal common line 404 is connected with each vertical common line 406. The horizontal common lines 404 are located between the vertical common lines 406, but are not extended to the data line 420 as they are in the first embodiment; the data line 420 also has no overlaps with the horizontal common lines 404. Moreover, each horizontal common line 404 is designed as an oblique line such that horizontal common lines 404 are unparallel.

In the second embodiment, horizontal connecting leads 408 are further designed and located on the side of the vertical common lines 406 to connect with the common lines in a neighboring pixel display region, and the horizontal connecting leads 408 pass through the data line 420 and have overlaps with the data line 420 to offer locations at which to form short circuits for defect repair. Positions on the vertical common line 406 for placing the horizontal connecting leads 408 are between a contact point 411 and another contact point 413 on the common lines.

In addition, a side-extending lead 405 and another side-extending lead 407 are further located onto the vertical common line 406 near the data line 420, wherein the side-extending lead 405 and the side-extending lead 407 all are extended to have unconnected overlaps with the data line 420 to offer more locations at which to form short circuits for defect repair. An open breach 409 in the vertical common line 406 near the data line 420 is placed between the side-extending lead 405 and the side-extending lead 407 in advance such that the frequency of laser cutting used is reduced thereby enhancing defect repair efficiency.

Compared with the first embodiment, the horizontal common line 404 is designed with diagonal geometry so the area occupied by the horizontal common line 404 in the opening 410 is larger. Leakage of light due to the openings 410 is thus reduced by the shelter provided by the horizontal common lines 404 in the openings.

If a defect repair process in the first embodiment is undergone, a position 417 at the horizontal common line 404 for laser cutting is used to prevent a data signal from transmitting to the horizontal common line 404; but a position 415 at the vertical common line 406 is used instead of the position 417 for laser cutting in the second embodiment. Because the area covered by the pixel electrode 402 at the position 415 is smaller than that at the position 417, the area of the opening 460 designed for laser cutting is smaller than that in the first embodiment (i.e., the area of the opening 110 in FIG. 1). Furthermore, only a region of the vertical common lines 406 for laser cutting has to be exposed, so there is no need to entirely expose intersections of the horizontal common lines 404 and the vertical common lines 406, and regions on the horizontal common lines 404 for connecting with the vertical common lines 406 are covered by the pixel electrode 402 partially. Therefore, leakage of light is reduced effectively by decreasing the opening area of the pixel electrode 402 in the second embodiment.

With the application of the second embodiment, not only is leakage of light due to the opening designed in the pixel electrode mitigated, efficient repair of defects in a panel is also achieved by employing a defect repair process like the first embodiment.

Embodiment 3

The present invention discloses further a LCD with defect reparability. Defect reparability is obtained by using the common lines, and $C_{st}$ is also made adjustable by utilizing a geometry change of the common lines in the third embodiment.

Figure 5:
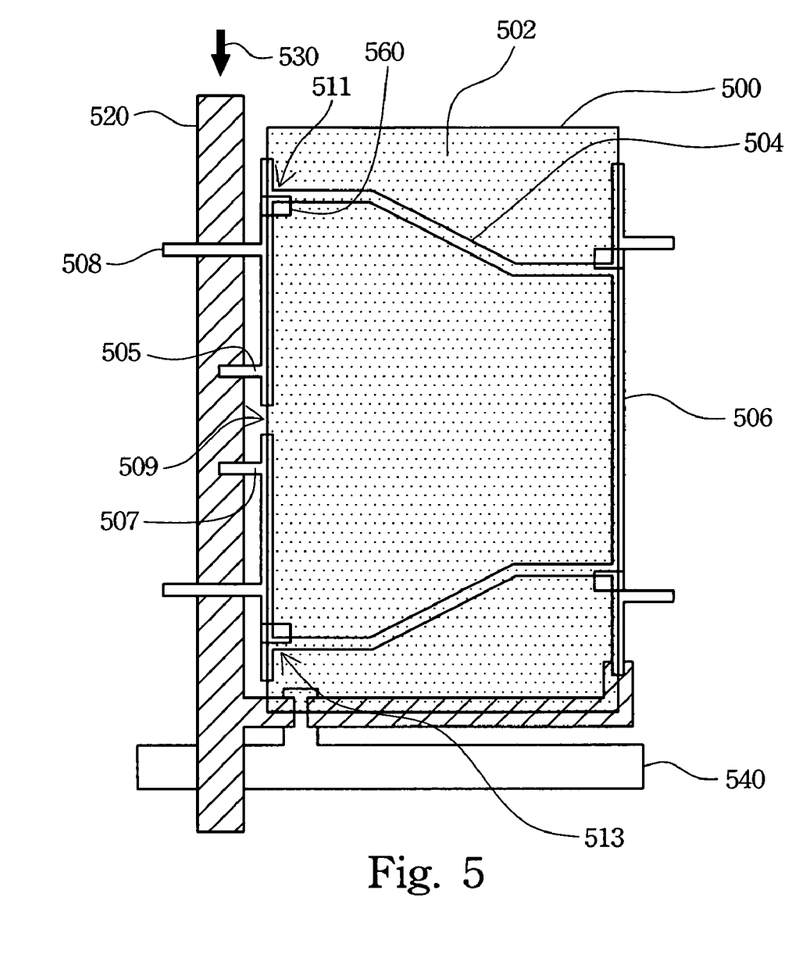
FIG. 5 is a top view showing a partial structure of the liquid crystal display in accordance with the third preferred embodiment of the present invention.

Referring to FIG. 5, a top view is shown of a partial structure of the LCD in accordance with the third preferred embodiment of the present invention. In FIG. 5, two horizontal common lines 504 and two vertical common lines 506 are placed in the a pixel display region 500 cross-controlled by a data line 520 and a scan line 540, and each horizontal common line 504 is connected with each vertical common line 506. The horizontal common lines 504 are located between the vertical common lines 506, but unlike the first embodiment, the horizontal common lines 504 are not extended to the data line 520 and have no overlaps with the data line 520. Compared with the second embodiment, each horizontal common line 504 is designed as a zigzag pattern comprised of an oblique segment and two ends which intersect the vertical common lines 506 perpendicularly.

The zigzag pattern of the horizontal common line 504 mirrors that of another horizontal common line 504. The zigzag pattern of the horizontal common line 504 near the data signal 530 source is started from a side of the vertical common line 506 near the data line 520 and extended to another vertical common line 506 in the transmission direction of the data signal 530. The zigzag pattern of another horizontal common line 504 near the scan line 540 is started from a side of the vertical common line 506 farther from the data line 520 and extended to the vertical common line 506 near the data line 520 in the transmission direction of the data signal 530.

The turns in the horizontal common lines 504 are utilized to adjust the slope change of the horizontal common line 504, such that the length of the horizontal common line 504 is controllable to adjust the $C_{st}$, such as when solving a flicker problem in a panel.

Like the second embodiment, horizontal connecting leads 508 are further designed and located onto the vertical common lines 506 to connect to the common lines in a neighboring pixel display region, and the horizontal connecting leads 508 overlap the data line 520 to offer locations by which short circuits may be formed for defect repair. Positions on the vertical common line 506 for placing the horizontal connecting leads 508 are between a contact point 511 and another contact point 513 of the common lines. The area of the opening 560 designed for laser cutting is smaller than that in the first embodiment (i.e., the area of the opening 110 in FIG. 1), and regions on the horizontal common lines 504 for connecting with the vertical common lines 506 are covered by the pixel electrode 502 partially, so leakage of light is reduced effectively in the third embodiment.

In addition, a side-extending lead 505 and another side-extending lead 507 are further located onto the vertical common line 506 near the data line 520, wherein the side-extending lead 505 and the side-extending lead 507 all are extended to have unconnected overlaps with the data line 520 to offer more positions at which short circuits may be formed to repair defects. An open breach 509 in the vertical common line 506 near the data line 520 is placed between the side-extending lead 505 and the side-extending lead 507 in advance to reduce the frequency of laser cutting used.

According to the aforementioned preferred embodiments of the present invention, with the application of the present invention, a LCD with good defect reparability is obtained and product yield and reliability of displays are therefore improved. The general processes of LCD fabrication are not affected; there is only a design change in common lines and pattern definition, and defect repair is therefore achieved efficiently by use of laser.

Because the common lines designed in each pixel are used as repair lines for defect repair, defects in a panel are repaired by utilizing the nearest common lines immediately. Therefore, there is no need to spend time moving a panel into a repair process, and the efficiency of defect repair is improved greatly. Moreover, with the shorter length yet higher population of repair lines in this invention, the RC loading due to repair lines is reduced and defect repair efficiency is promoted.

The LCD of the present invention further reduces the probability of a $C_{st}$-open condition. When a common line is open, a $C_{st}$-open defect is avoided by utilizing other common lines designed in a pixel.

While the present invention has been disclosed with reference to the preferred embodiments of the present invention, it should not be considered as limited thereby. Various possible modifications and alterations by one skilled in the art can be included within the spirit and scope of the present invention, and the scope of the invention is determined by the claims that follow.

What is claimed is:

1. A liquid crystal display with defect reparability, comprising:
    at least a data line;
    at least a pixel display region, comprising:
    a first vertical common line, comprising at least a side-extending lead, wherein the first vertical common line is parallel to the data line and located near the data line, the side-extending lead is extended to overlap the data line, and the first vertical common line further comprises at least a breach between the side-extending lead and another side-extending lead;
    a second vertical common line, wherein the second vertical common line is parallel to the first vertical common line; and
    a plurality of horizontal common lines, wherein the horizontal common lines overlap but do not touch the data line, each of the horizontal common lines is intersected to connect with both the first vertical common line and the second vertical common line, and the side-extending lead is disposed between the horizontal common lines; and
    at least a scan line, wherein the pixel display region is cross-controlled by the data line and the scan line respectively, and the data line is used to transmit a data signal to the pixel display region.

2. The liquid crystal display of claim 1, wherein the horizontal common lines are constructed to form a "#" pattern structure with the first vertical common line and the second vertical common line.

3. The liquid crystal display of claim 1, wherein each of the horizontal common lines is a straight, diagonal or zigzag structure.

4. The liquid crystal display of claim 1, wherein the pixel display region comprises a pixel electrode, and the pixel electrode is designed to have at least an opening exposing intersections of the horizontal common lines and the first vertical common line.

5. The liquid crystal display of claim 4, wherein the pixel electrode is further designed to have another opening exposing intersections of the horizontal common lines and the second vertical common line.

6. The liquid crystal display of claim 1, wherein the horizontal common lines are connected to another horizontal common lines in a neighboring pixel display region, and the data signal is able to transmit to the neighboring pixel display region simultaneously.

7. A liquid crystal display with intrinsic defect reparability, comprising:
    at least a data line;
    at least a pixel display region, comprising: a first vertical common line,
        wherein the first vertical common line is parallel to the data line and located near the data line;
    a second vertical common line, wherein the second vertical common line is parallel to the first vertical common line; and
    a plurality of horizontal common lines, wherein the horizontal common lines are between the first vertical common line and the second vertical common line, and each of the horizontal common lines is connected with both the first vertical common line and the second vertical common line;

a plurality of horizontal connecting leads, wherein the horizontal connecting leads are located onto the first vertical common line, and each of the horizontal common lines passes through the data line and connects to the second vertical common line in a neighboring pixel display region, besides, each of the horizontal connecting leads has an unconnected overlap with the data line; and at least a scan line, wherein the pixel display region is cross-controlled by the data line and the scan line respectively, and the data line is used to transmit a data signal to the pixel display region;

wherein the first vertical common line comprises at least a side-extending lead between the horizontal connecting leads, and the side-extending lead is extended to overlap the data line, and wherein the first vertical common line further comprises at least a breach between the side-extending lead and another side-extending lead.

8. The liquid crystal display of claim 7, wherein the horizontal connecting leads are not collinear with the horizontal common lines.

9. The liquid crystal display of claim 7, wherein each of the horizontal common lines is a straight, diagonal or zigzag structure.

10. The liquid crystal display of claim 7, wherein the horizontal common lines have at least one pair of mirrored horizontal zigzag common lines.

11. The liquid crystal display of claim 10, wherein the pair of mirrored horizontal zigzag common lines comprise a first zigzag common line and a second zigzag common line, and the first zigzag common line is closer to a source of the data signal than the second zigzag common line, besides, the first zigzag common line is started from the first vertical common line and extended to the second vertical common line in a transmission direction of the data signal, and the second zigzag common line is started from the second vertical common line and extended to the first vertical common line in the transmission direction of the data signal.

12. The liquid crystal display of claim 11, wherein each of the horizontal connecting leads is located onto the first vertical common line at a position, and the position is between a connected point and another connected point on the first vertical common line for connecting the first zigzag common line and the second zigzag common line respectively.

13. The liquid crystal display of claim 7, wherein the pixel display region comprises a pixel electrode, and the pixel electrode is designed to have openings exposing intersections of the horizontal common lines connecting respectively with the first vertical common line and the second vertical common line.

14. The liquid crystal display of claim 13, wherein each of the openings exposes a portion of a region on the horizontal common lines for connecting with the first vertical common line, and another portion of the region is covered by the pixel electrode.

15. A liquid crystal display with defect reparability and storage capacitor ($C_{st}$) adjustability, comprising:

at least a data line;

at least a pixel display region, comprising:

a first vertical common line, wherein the first vertical common line is parallel to the data line and located near the data line;

a second vertical common line, wherein the second vertical common line is parallel to the first vertical common line; and at least a pair of mirrored horizontal zigzag common lines, wherein the pair of mirrored horizontal zigzag common lines is between the first vertical common line and the second vertical common line, and the pair of mirrored horizontal zigzag common lines further comprises:

a first zigzag common line, wherein the first zigzag common line is connected with both the first vertical common line and the second vertical common line; and a second zigzag common line, wherein a pattern structure of the second zigzag common line is mirrored the pattern structure of the first zigzag common line, and the second zigzag common line is also connected with both the first vertical common line and the second vertical common line;

a plurality of horizontal connecting leads, wherein the horizontal connecting leads are located onto the first vertical common line, and each of the horizontal common lines passes through the data line to connect to the second vertical common line in a neighboring pixel display region, besides, each of the horizontal connecting leads has an unconnected overlap with the data line; and at least a scan line, wherein the pixel display region is cross-controlled by the data line and the scan line respectively, and the data line is used to transmit a data signal to the pixel display region;

wherein the first vertical common line comprises at least a side-extending lead between the horizontal connecting leads, and the side-extending lead is extended to overlap the data line, and wherein the first vertical common line further comprises at least a breach between the side-extending lead and another side-extending lead.

* * * * *